Nov. 22, 1949  E. A. CANALIZO  2,488,802
RAKE
Filed Aug. 13, 1946

Inventor
Eugenio A. Canalizo
By J. Irvine
Atty.

Patented Nov. 22, 1949

2,488,802

UNITED STATES PATENT OFFICE 2,488,802

RAKE

Eugenio Antonio Canalizo, Mexico City, Mexico

Application August 13, 1946, Serial No. 690,149
In Mexico August 25, 1945

1 Claim. (Cl. 56—400.17)

This invention refers in general to agricultural implements, especially to rakes for the purpose of collecting dry leaves, etc., and more particularly it refers to certain improvements in rakes of the above-mentioned kind, of those made with strips of bamboo or reed, provided with a handle of the same material.

I am perfectly aware that rakes made with bamboo or reed and secured with textile ties, or of the same material, are already known. The implement invented by me is substantially characterized in that the bamboo or reed strips are tied by means of two or more rows of one-piece staples, giving the implement a sturdiness and fixedness thus far unknown in rakes of this kind.

It is also characterized in that the rear end of the bamboo or reed strips is conveniently secured by means of a metal plate solidly securing it and permanently keeping it in its proper place, the said plate providing further the proper reinforcement to secure the end of the handle.

These and other characteristics, details and differences from the known, will become clearly apparent from the following description, and from the accompanying drawings which illustrate the invention, the same reference characters indicating the same parts in the six shown figures.

Before describing in detail the present improved implement as invented by me, I desire it to be well understood that the drawings only serve to illustrate as an example the preferred manner in which I practice my invention, which is not restricted in any way to the specified details as illustrated and described herein, as alterations and amendments may be made in parts and secondary pieces, without any further limitation than is contained in the scope of attached claim.

Figure 6:
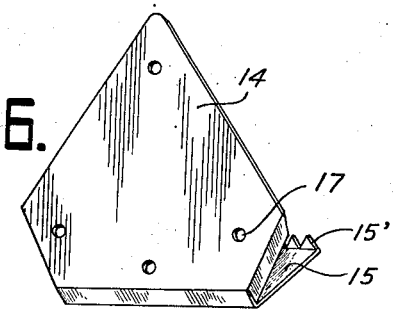
Fig. 6 is an enlarged perspective view of the same piece illustrated by Fig. 5, bent more or less in the position it has when it is adapted to its purpose.
Figure 5:
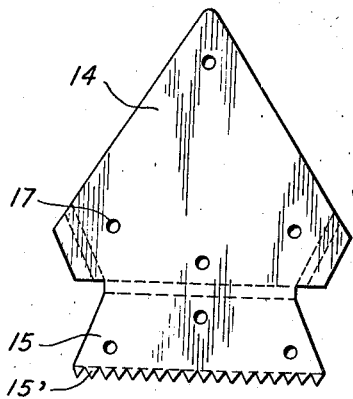
Fig. 5 is an enlarged plan view of the piece securing the rear end of the rows constituting the prongs of the rake, in its open position.

As shown in the drawings, handle 10 of the implement is provided with a groove 11 at one of its ends in order to form the forked pole 12 securing the implement proper. Within the said groove 11, plate 14, as shown in Figures 5 and 6 of accompanying drawings is secured by means of screws 13 or the like. The said plate 14 is of a sensibly triangular or polygonal shape, and provides a flange 15 which is bent for the purpose of forming a securing jaw to the end which is behind strips 16 forming the fan of the rake. The said flange 15 is provided with a dented edge 15', whose teeth will make even more solid the securing of the end of the said strips 16. In addition to screws 13 securing the handle 10 of the implement, plate 14 is provided with punchings 17 for the purpose of keeping flange 15 in its closed position by means of screws, rivets or the like 18.

Figure 1:
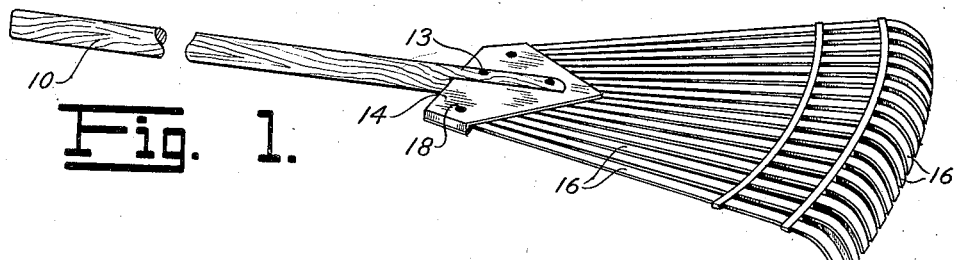
Fig. 1 is a conventional perspective view of a rake made in accordance with this invention, in a horizontal position.
Figure 2:
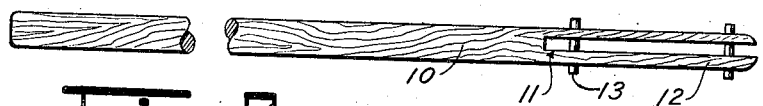
Fig. 2 is a profile of the handle securing the strips constituting the prongs of the rake, for the purpose of showing its fore end cut in the form of a hairpin.
Figure 3:
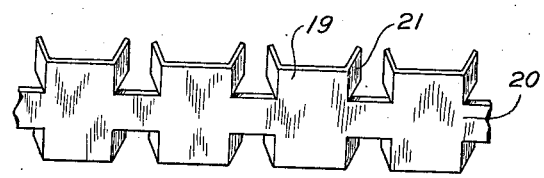
Fig. 3 is an enlarged perspective view of the obverse and reverse sides of the row of staples securing the prongs of the rake by their nearest portion to the bent end of the same.
Figure 4:
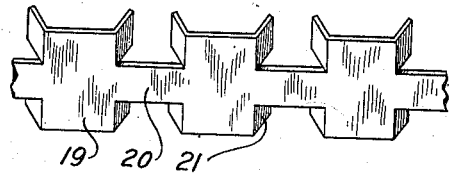
Fig. 4 is also an enlarged conventional perspective view of the obverse and reverse sides of another row of staples made of one piece, the staples being nearer to each other, the said row being the one positioned behind the one illustrated in Fig. 3.

In order to keep the said strips 16 in their open condition like a fan; that is to say, with their distance apart gradually increasing, the rows of staples made of a single piece as better illustrated in Figs. 3 and 4 of the drawings, are used; and, of course, staples 19 of the said rows will have a greater or lesser distance apart, according as the rows 16 are desired to be more or less apart among themselves. For instance, the row of staples nearer to the handle, will be nearer together; and, in case they are closer to the bent end, they will be farther apart.

Staples 19 form an integral piece with a cross piece or rib 20, preferably reinforced, providing the necessary distance apart between them, and rows 16 of the rake are strongly secured, inasmuch as legs 21 of staples 19 are bent and clamped on the reverse of each of the rows 16. As will be understood, the back of each staple 19 remains on the obverse of the said rows 16 of the rake, and the legs 21 are bent and clamped on the reverse of each of them.

As will be easily understood, the connection between the rows constituting the rake, is made with the greatest strength in the above-described manner, both in its rear end and in its middle and in the forward end, the life of the implement being much longer than of those so far known and used.

Having thus described the invention what I consider as new and desire to secure by Letters Patent are:

I claim:

A rake comprising a handle formed at one end with an open slot, a clamp including a top, rear part of the top being bent at right angles and thence forwardly parallel with and spaced from the top to provide a bottom, the forward end of the bottom being bent upwardly and provided with teeth, a part of each side of the top being bent at right angle and inwardly to provide with the bottom a space, a series of tines fitted in the space between the top and bottom of the clamp, means for securing the tines between the top and bottom of the clamp and means for securing the handle to the clamp.

EUGENIO ANTONIO CANALIZO.

REFERENCES CITED

The following references are of record in the file of this patent:

UNITED STATES PATENTS

| Number | Name | Date |
|---|---|---|
| Re. 17,606 | Withington | Feb. 25, 1930 |
| 489,672 | Gibbs | Jan. 10, 1893 |
| 839,249 | Wright | Dec. 25, 1906 |
| 1,500,441 | Congable | July 8, 1924 |
| 1,909,754 | Carlson | May 16, 1933 |
| 2,077,347 | Barbee | Apr. 13, 1937 |
| 2,163,421 | Caramanico | June 20, 1939 |
| 2,235,937 | Linberg | Mar. 25, 1941 |
| 2,386,617 | Lewis | Oct. 9, 1945 |
| 2,456,876 | Keller | Dec. 21, 1948 |